P. L. MANLET.
NUT LOCK.
APPLICATION FILED APR. 24, 1909.
952,917.
Patented Mar. 22, 1910.
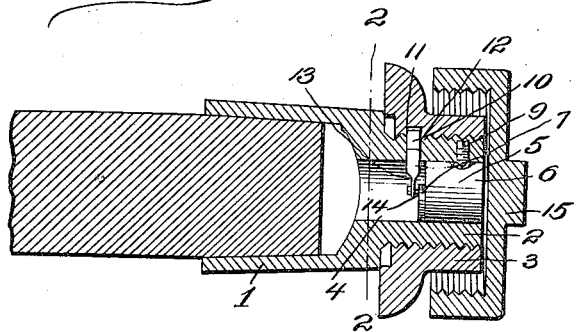
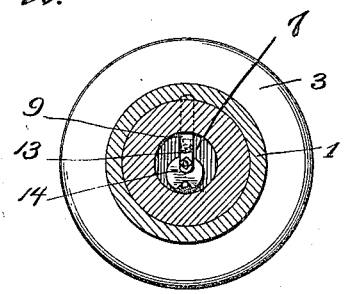
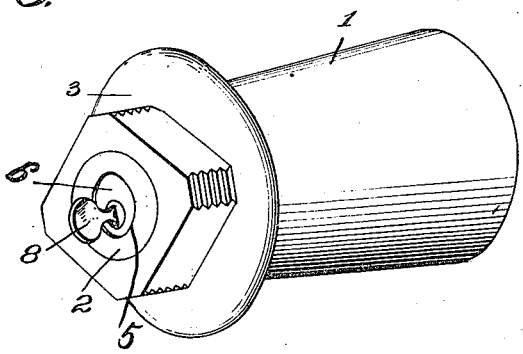
Witnesses
G. F. Folson.
U. B. Hillyard.
Inventor
Peter L. Manlet.
By Victor J. Evans
Attorney

UNITED STATES PATENT OFFICE.

PETER L. MANLET, OF ST. PAUL, MINNESOTA.

NUT-LOCK.

952,917.

Specification of Letters Patent. Patented Mar. 22, 1910.

Application filed April 24, 1909. Serial No. 491,960.

*To all whom it may concern:*

Be it known that I, PETER L. MANLET, a citizen of the United States, residing at St. Paul, in the county of Ramsey and State of Minnesota, have invented new and useful Improvements in Nut-Locks, of which the following is a specification.

The purpose of the present invention is to prevent the loosening of axle nuts by means of which vehicle wheels are retained in place upon the spindles of axles.

This invention is designed to supply a key operated lock mechanism for securing the axle nut after the latter has been properly positioned upon the axle thereby preventing possible displacement of the axle nut either by accident or by design of anyone bent upon mischief.

In accordance with this invention a key operated lock mechanism is located within the axle and coöperates with a lock bolt which is adapted to be projected into an opening in communication with the threaded opening of the axle nut to secure the latter against further movement in either direction when arranged upon the extremity of the axle arm to retain the vehicle wheel in place thereon.

The improvement consists of the novel features details of construction and combination of parts which hereinafter will be more particularly set forth illustrated in the drawings hereto attached and finally pointed out in the appended claim.

Referring to the drawings forming a part of the specifications, Figure 1 is a central longitudinal section of the outer portion of an axle arm provided with a nut locking mechanism embodying the invention. Fig. 2 is a transverse section on the line 2—2 of Fig. 1. Fig. 3 is a perspective view of the end portion of the axle having the dust cap removed and showing the key in position.

Corresponding and like parts are referred to in the following description and indicated in all the views of the drawings with the same reference characters.

The axle arm 1 may be of any type or construction and is provided at its outer end with a reduced portion 2 exteriorly threaded upon which the axle nut 3 is mounted. A longitudinal opening 4 extends inward from the outer end of the axle arm and is adapted to receive a key operated lock mechanism 5 of the cylinder type and comprising a casing 6 and a rotary bolt 7 the latter being provided with the usual spring actuated pins of the well known Yale lock type and having a key opening to receive the key 8 by means of which the rotary bolt 7 is operated. The casing 6 is secured within the opening 4 in any substantial way as by means of a pin 9 which is received in registering openings formed in the casing 6 and threaded end 2 of the axle arm. To prevent displacement of the pin 9 it may be threaded either into the casing or axle arm or both.

The axle nut 3 when screwed home upon the threaded end 2 of the axle arm is held in place by means of a lock bolt 10 which operates freely in registering openings 11 and 12 provided respectively in the threaded end 2 of the axle arm and in a side of the axle nut 3. A link 13 connects the lock bolt 10 with the rotary bolt 7 said link having eccentric connection with said rotary bolt at 14. When the rotary bolt 7 is turned to one position the lock bolt 10 is projected from the opening 11 of the axle arm into the opening 12 of the axle nut thereby securing the latter against rotation. When the lock bolt is projected into locked engagement with the axle nut the rotary bolt 7 is locked by the pins coöperating therewith in the manner well understood. When the rotary bolt is turned to the other extreme position the lock bolt 10 is withdrawn from the opening 12 of the axle nut and the latter is free to be turned so as to be removed from the axle arm. The rotary bolt 7 may be turned only by means of the key 8 in the manner well understood. The cap 15 is removed when access to the lock mechanism is desired to release the axle nut. After the key 8 has been introduced into the key opening of the rotary bolt 7 the latter is released and may be rotated, thereby withdrawing the lock bolt 10 from engagement with the axle nut, so that the latter may be turned off or on as desired. When the axle nut is in position upon the axle arm the rotary bolt 7 is turned to project the lock bolt into the opening 12 of the axle nut, thereby securing the latter against rotation in either direction.

The threaded opening of the axle nut extends entirely therethrough and in order to protect the key opening of the lock mechanism 5 the cap 15 is fitted upon the axle nut and may be secured in place thereon in any manner. The cap 15 renders the key operated lock mechanism dust proof and prevents mud and other foreign matter finding its way into the lock mechanism and interfering with the free operation thereof.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Claim.

In combination with an axle arm having its outer portion reduced and externally threaded and formed with a longitudinal opening extended inward from its extremity, a lock mechanism comprising a casing and a rotary bolt inserted in the opening of the axle arm, a pin for securing the lock mechanism within the axle arm, a lock bolt adapted to operate in a transverse opening formed in the threaded end portion of the axle arm, a link connecting the lock bolt with the rotary bolt of the lock mechanism and having eccentric connection with said rotary bolt, an axle nut adapted to screw upon the threaded end of the axle arm and having an opening to receive the projected end of the lock bolt, and a key for operating the lock mechanism.

In testimony whereof I affix my signature in presence of two witnesses.

PETER L. MANLET.

Witnesses:
    ROBERT MEACHAM,
    A. F. MASCHGER.